United States Patent [19]

Butwell

[11] Patent Number: 4,600,510

[45] Date of Patent: Jul. 15, 1986

[54] LIQUID TREATMENT APPARATUS

[75] Inventor: Anthony J. Butwell, Langford, England

[73] Assignee: Water Research Centre, Langford, England

[21] Appl. No.: 719,821

[22] Filed: Apr. 4, 1985

[30] Foreign Application Priority Data

Apr. 6, 1984 [GB] United Kingdom ................ 8408966
Jul. 10, 1984 [GB] United Kingdom ................ 8417594

[51] Int. Cl.⁴ .......................... E05B 3/12; E05B 7/32; E03C 1/084
[52] U.S. Cl. .................................... 210/273; 210/405; 239/177.1; 239/225; 239/248; 239/296

[58] Field of Search ............... 210/233, 272, 273, 405, 210/407; 239/177.1, 177.2, 254, 225, 248, 296

[56] References Cited

U.S. PATENT DOCUMENTS 3,897,000 7/1975 Mandt .................................. 210/273

Primary Examiner—Frank Sever
Attorney, Agent, or Firm—Watson, Cole, Grindle & Watson

[57] ABSTRACT

In a water treatment apparatus, the jets in the distributor arms of a percolating filter are kept clear from jamming by automatic actuation of plungers which enter the jets to dislodge any obstructions therein, each plunger being individually mounted on the arm adjacent its respective jet.

7 Claims, 10 Drawing Figures

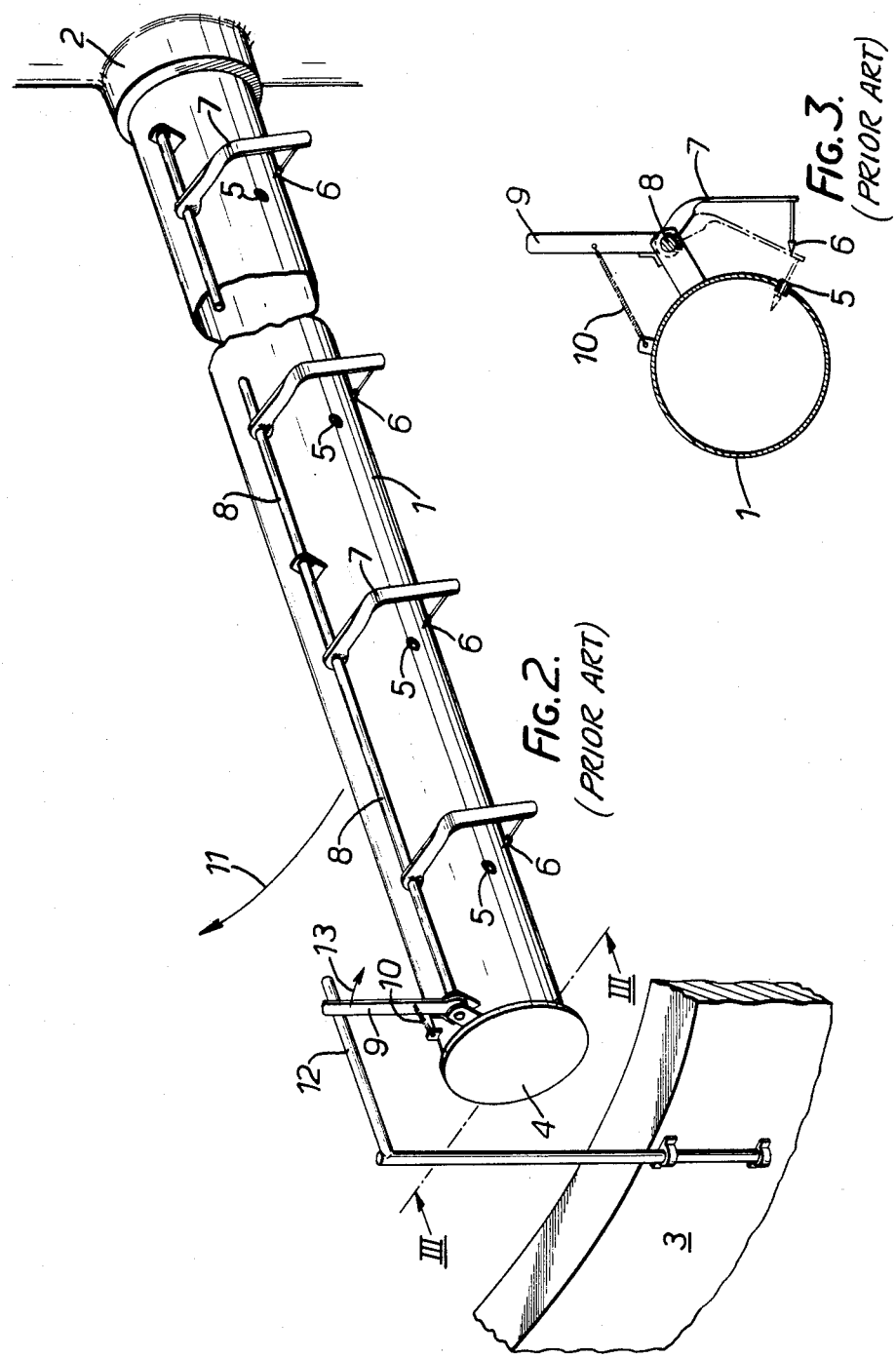

LIQUID TREATMENT APPARATUS

This invention relates to liquid treatment apparatus and, more particularly, to distributor arms utilised in filtration plant.

Percolating filter plants for the treatment of aqueous effluents such as sewage are well known. They comprise a filter bed and a series of hollow liquid distributor arms disposed horizontally over the bed and mounted on a vertical shaft centrally of the bed. The shaft is rotated to move the arms to distribute the liquid over the bed from jets disposed in the distributor arms. One problem with these known arrangements is that the jets tend to clog up which results in an uneven distribution of the liquid over the filter. The jets have to be cleaned manually. To alleviate this problem, removable screens are sometimes installed in channels conveying primary tank effluent, but these too usually need clearing at least daily, and the screenings have to be disposed of.

It has been proposed to deal with this problem of jet blockage by providing, adjacent each jet, a plunger which intermittently is operable to enter the jet to clear any blocking debris. In the known arrangements, the plungers are mounted on a common axle and the axle is caused to turn to move the plungers into their respective jets, and to return (to remove the plungers) by engagement of a lever with a trip mechanism. Thus, as the arm moves above the filter bed, the lever rides up over a trip and then returns to its starting position.

There are a number of problems with these known arrangements. Firstly, it can be difficult to install a series of plungers on a common axle, so that each plunger is precisely oriented to enter its respective jet. Also, after installation, mis-alignment can occur which can damage the device and also jam movement of the distributor arms themselves. Further, the installation is complex and relatively expensive.

It has now been found that a more reliable arrangement and one which is less complex and cheaper to install and maintain, can be made by providing a separate mounting for each plunger, rather than by having them all on a common axle. Further, each mounting is preferably a bracket attached to the distributor arm at the respective jet.

According to the present invention, there is provided a hollow distributor arm for a filtration plant, which arm comprises a plurality of jets mounted in a wall thereof to distribute liquid, supplied through said arm, out of the arm and over a filter, wherein each jet has associated therewith a support member mounted externally on the arm, which support member supports a plunger pivotally movable into and out of said jet to keep the same clear of obstructions.

The invention also includes a filtration unit which comprises a filter bed and at least one hollow liquid distributor arm mounted, at one end thereof, to lie generally horizontally above the filter bed and to be turned about a generally vertical axis to move over the filter bed, said arm having a plurality of jets therein, to distribute liquid supplied through said arm onto the filter bed as the arm is turned, each jet having associated therewith a plunger pivotally mounted externally on the arm by a support member therefor, and movable into and out of the respective jet to keep it clear of obstructions by periodic engagement with an abutment on the filter bed.

In the distributor arms of the invention, each jet has its own individual plunger, and each plunger is individually mounted with respect to the arm by an individual support member which is mounted externally on the arm. This arrangement provides a number of advantages over the prior known axle arrangements. In an especially preferred embodiment of the present invention, the support member comprises a strap for attachment to the distributor arm and a body portion attached to the strap (and most preferably integrally moulded therewith), the body portion having a plunger extending therefrom. The strap includes a flexing area about which the body and plunger hinge to enable the plunger to enter its respective jet.

In order that the invention may be more fully understood, embodiments thereof will now be described, by way of example only, with reference to the accompanying drawings, in which:

FIG. 2 is a view of a first known self-cleaning mechanism for the distributor arm of a percolating filter;

FIG. 3 is a section on II-II of FIG. 1;

Figure 1:
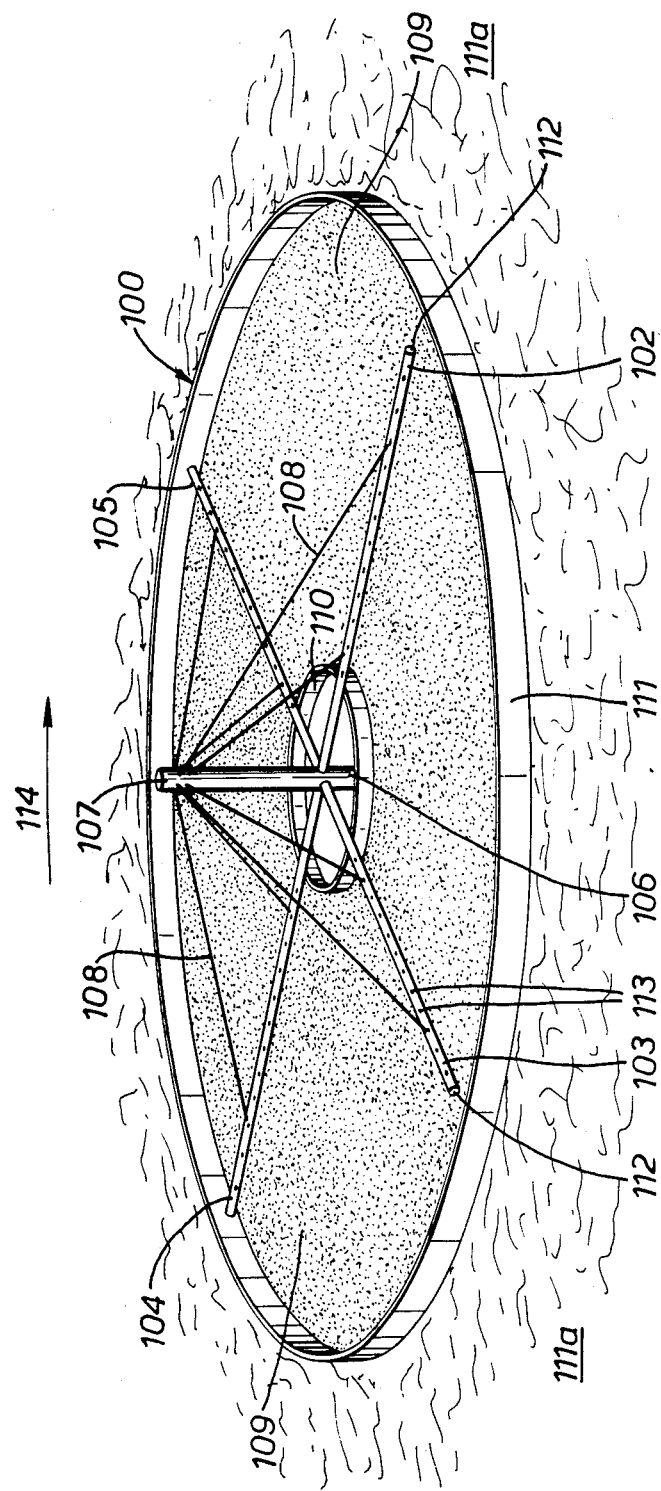
FIG. 1 is a schematic view of a percolating filter with four distributor arms.

Referring to the drawings, FIG. 1 illustrates one form of percolating filter 100. This arrangement has four hollow distributor 102, 103, 104, 105 arms extending radially outwards from a supporting upright supply pipe 106 which supplies liquid (to be filtered) to each arm. Pipe 106 carries an upward extension 107 from which guy ropes, spars or the like 108 extend to support the arms 102, 103, 104, 105. The filter bed 109 is formed between a circular inner wall 110 and a circular outer wall 111 and extends into the ground 111a (the belowground arrangements are not shown).

The outer end of each hollow arm 102, 103, 104, 105 is closed by a plate 112, but each arm has a series of orifices 113 spaced along its length. The orifices may have jets or nozzles mounted therein. In use, the liquid to be filtered issues from the arms through the orifices and on to the filter bed 109. The supply pipe 106, extension 107 and the four arms 102, 103, 104, 105 are slowly rotated in the direction of arrow 114 so that the arms sweep over the whole of the filter bed surface to distribute the liquid thereover.

FIG. 1 thus illustrates a percolating filter with distributor arms.

FIGS. 2 to 5 show two known arrangements for keeping the orifices (in such distributor arms) free from debris.

Referring to FIG. 2, there is shown a distributor arm 1 mounted horizontally to extend radially of a shaft 2 which is at the centre of the filter surface. A portion of the outer wall 3 of the filter is shown. The arm 1 is hollow, its outer end being conventionally closed by a plate 4. It comprises a series of orifices or jets 5 from which (in use) the liquid (supplied internally of the arm) issues on to the filter surface.

To keep the jets clear, a series of plungers 6 are mounted on arms 7 each fixed to the axle 8 which has, at its outer end, an upstanding operating lever 9. A spring 10 is provided to maintain lever 9 upright.

Arm 1 is driven in the direction of arrow 11 and, at each complete revolution about the axis of shaft 2, lever 9 bears against a tripping arm 12 (which is fixed to wall 3). The lever is moved, against the bias of spring 10, in the direction of the arrow 13. This causes axle 8 to turn about its axis to cause plungers 6 to enter their respective jets 5. As distributor arm 1 moves on beyond tripping arm 12, lever 9 disengages therefrom (i.e. passes underneath) and is returned to the (illustrated) upright position by spring 10. This return motion withdraws the plungers from the jets.

FIG. 3 shows, in full lines, the position of the plungers as in FIG. 2, and in discontinuous lines the positions upon insertion of the plungers in the jets 5.

Figures 4, 5:
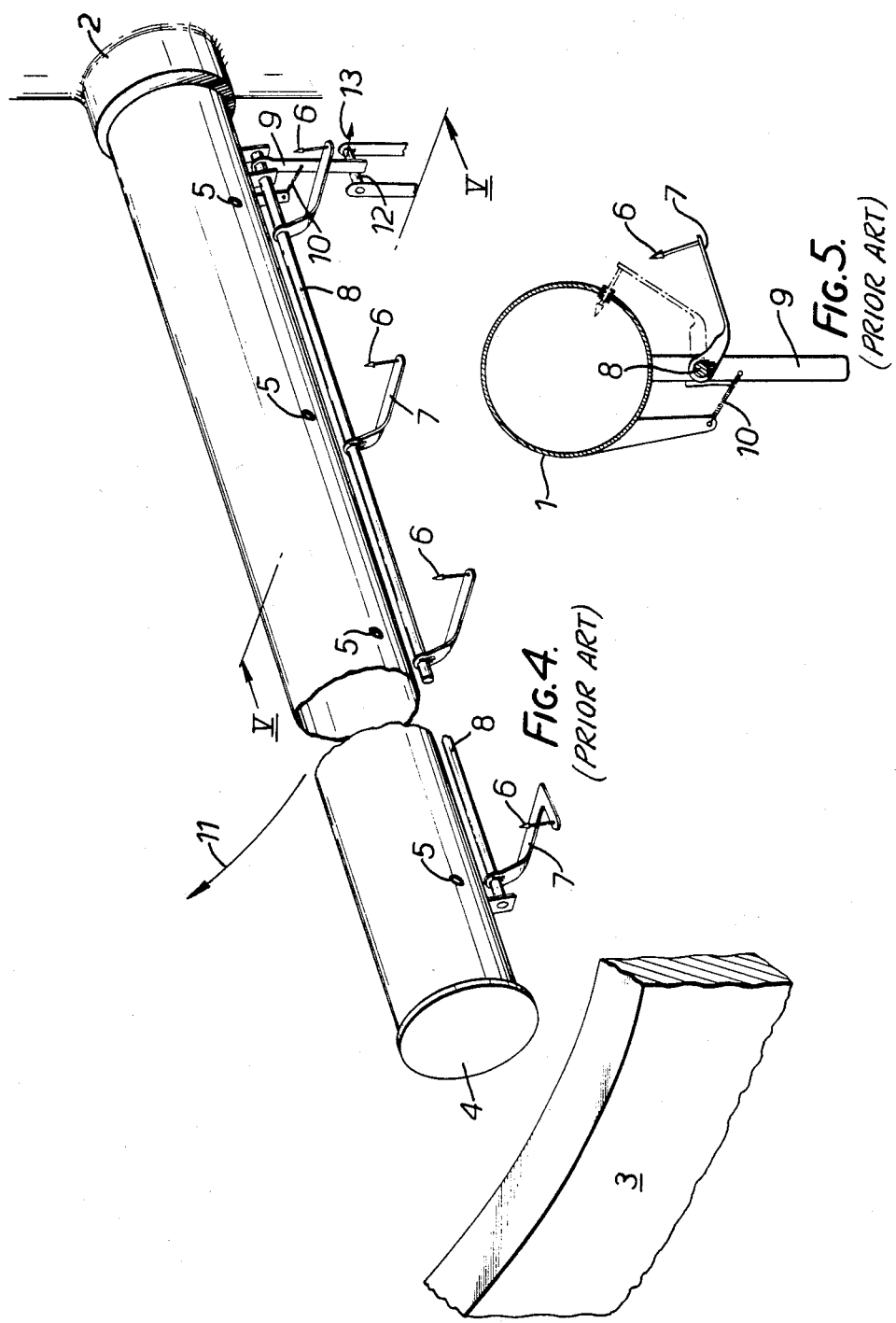
FIG. 4 is a view of a second known self-cleaning mechanism for the distributor arm of a percolating filter.
FIG. 5 is a section on the line IV—IV of FIG. 3.

FIGS. 4 and 5 are similar to FIGS. 2 and 3 and like numerals have been used to indicate like parts. In FIGS. 4 and 5, however, it will be seen that axle 8 lies below the distributor arm 1, and the operating lever 9 extends downwardly (contrast FIGS. 2 and 3) to a trip arm just above the filter surface. Also, the lever 9 is at the inner end of distributor arm 1.

Figure 6:
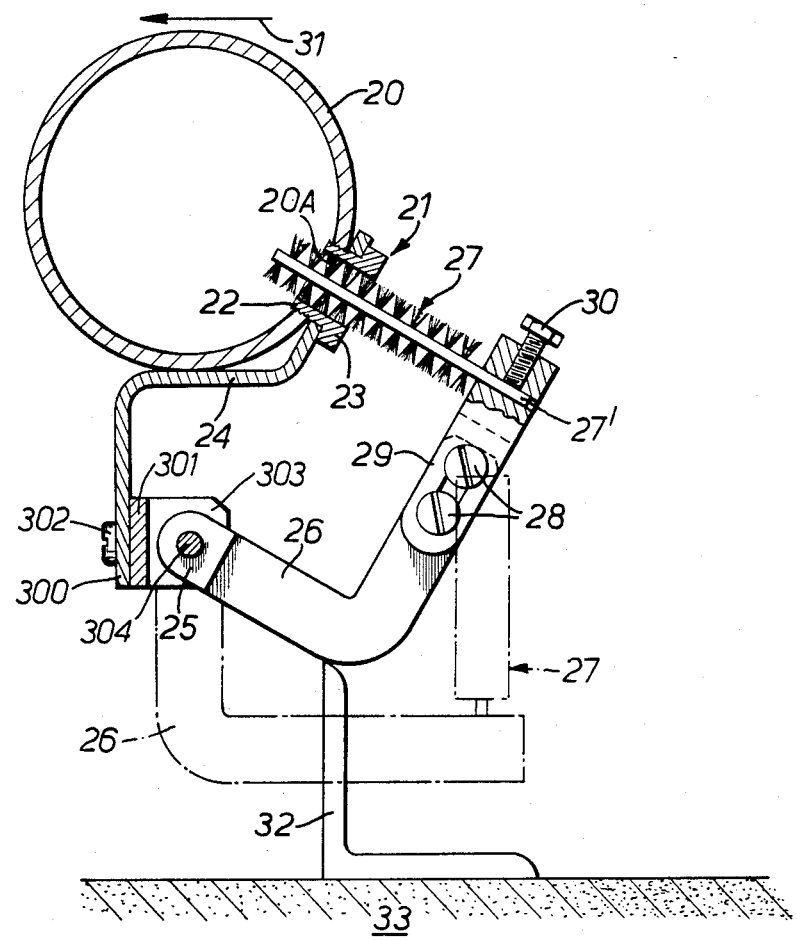
FIG. 6 is a section through one embodiment of distributor arm of the invention.
Figure 7:
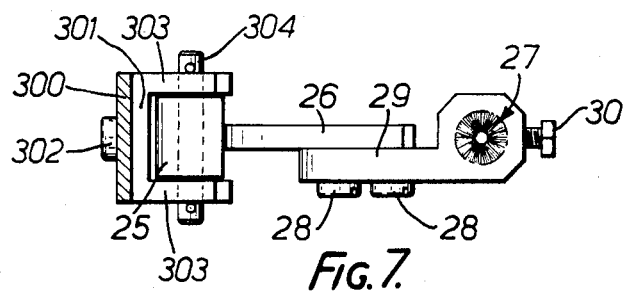
FIG. 7 is a top plan view of the arrangement of FIG. 5 (omitting the arm itself)
Figure 8:
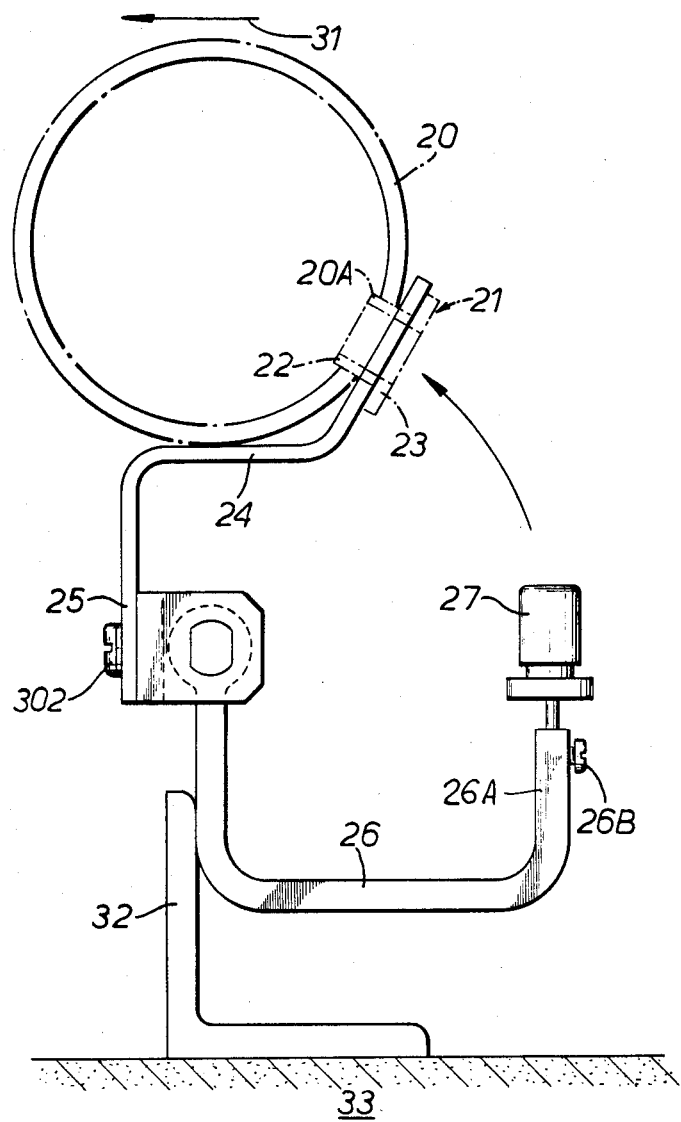
FIG. 8 is a section through a second embodiment of distributor arm of the invention.

FIGS. 6 and 7, and FIG. 8 show two embodiments in accordance with a first aspect of the invention. In both these embodiments, the plungers are not all mounted on a common axle but rather are individually mounted each on a bracket associated with the respective jet.

Referring to FIGS. 6 and 7, the distributor arm 20 has a series of orifices 20A therein (as in FIGS. 2 to 5), in each of which is a nozzle member 21. This is in the form of a bush comprising a cylindrical member 22 with an external collar 23. The inner end of the member 22 is screw-threadedly received in orifice 20A. As shown in FIG. 6, cylindrical member 22 passes through a hole in the end of a shaped bracket 24, and collar 23 of nozzle 21 bears against the bracket effectively to secure the bracket to arm 20 and rigidly mount it thereon. At the other end 300 of the bracket 24 is a U-shaped member 301 secured to bracket 24 by bolt 302. The opposed arms 303 of the member 301 each have an aperture to receive a hinge pin 304. The hinge pin passes through a bore in end 25 of a shaped plunger arm 26. Arm 26 has a plunger brush 27 mounted thereon. The position of the brush 27 relative to the arm 26 is adjustable via screws 28 and slide member 29. Brush 27 has a rearwardly projecting spindle 27' received in a bore in extension 28 and held therein by bolt 30.

As illustrated in full lines, brush 27 is entering the nozzle 21. Thus, arm 20 is moving in the direction of arrow 31, and plunger arm 26 is riding up over tripping arm 32. This forces the brushes 27 into the jets. As the distributor arm 20 moves further on, the plunger arm 26 returns to the "at-rest" position shown in discontinuous lines (FIG. 6), the brushes 27 being thus removed from the jets 21. FIG. 7 shows a top plan view of the "at-rest" position (omitting the distributor arm 20).

As shown in FIG. 6, tripping arm 32 is positioned on the filter surface 33.

The arrangement of FIG. 8 is very similar to that of FIGS. 6 and 7 and like numerals indicate like parts. In FIG. 8, a shorter plunger 27 (which is not a brush) is used, and the plunger arm 26 is of U-shape, the side 26A of the "U" receiving the plunger and including an adjustment screw 26B.

In the arrangements shown in FIGS. 6 to 8, the plunger is hinged to the bracket. In practice, this can sometimes give rise to problems. For example, in very cold weather, the hinges can become iced, and so jammed. Also, in FIGS. 6 to 8, the brackets and plunger arrangements consist of a number of separate parts which is generally undesirable since it increases the cost of manufacture and assembly, and often also the cost of maintenance. The arrangement of FIGS. 9 and 10 overcomes these problems.

Figure 9:
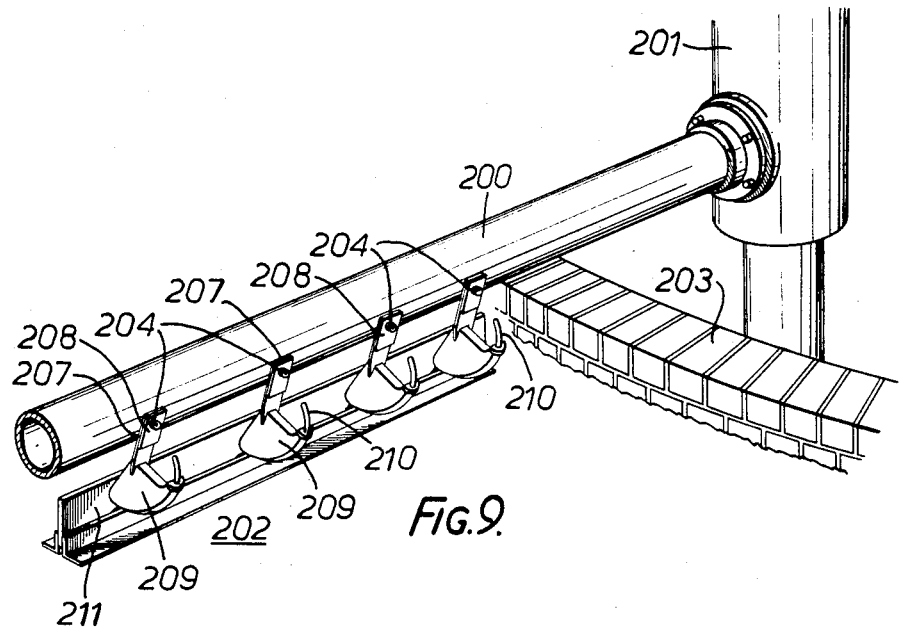
FIG. 9 is an orthogonal view of a third embodiment of distributor arm of the invention.
Figure 10:
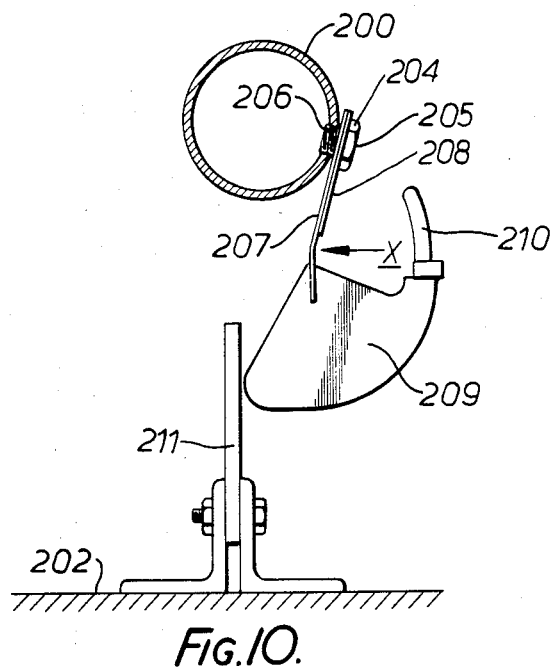
FIG. 10 is a section of the arm of FIG. 9.

FIGS. 9 and 10 show a distributor arm 200 (mounted on a supply riser 201) and extending over the filter bed surface 202. The inner filter wall 203 is also shown (in part). The arm 200 has a series (only four illustrated) of jets 204 therein each comprising a flanged nozzle 205 screwed into an orifice 206 in the arm 200. Each flayed nozzle 205 passes through the end portion of a strap member 207 and reinforcing plate 208. The strap 207 has a generally segment-shaped body 209 attached to its lower end, and from body 209 projects plunger 210. In practice, strap 207 and body 209 are a one piece plastics or rubber (eg. EPDM) moulding formed around the end of plunger 210. Reinforcing plate 208 lies flat against strap 207 over its upper portion, but plate 208 stops short of body 209 and in the region "X" between body 209 and the lower end of plate 208, the strap 207 has a flexing area, i.e. it is free to flex. Flexure about a horizontal axis in this area permits body 209 and plunger 210 to swing upwards and enter nozzle 205 when body 209 rides up over a trip bar 211 laid on the filter surface.

Strap 207 is of rectangular section and has a greater width than thickness. This helps to ensure that the plunger 210 will be correctly positioned to enter its respective nozzle 205. Body 209 includes a spacer 212 which controls the depth to which the plunger 210 penetrates into the distributor arm 200 through a nozzle 204.

The self-cleaning mechanisms of the invention for the jets of distributor arms are especially useful in the biological filtration of finely-screened sewage using high-voidage plastics filter elements. The sewage to be treated is finely-screened to remove only the large materials, and is then distributed over a bed of the filter elements using distributor arms fitted with the cleaning mechanisms of the present invention.

I claim:

1. An apparatus comprising hollow distributor arm for a filtration plant, which arm includes an elongate hollow member; a plurality of jets individually mounted in said hollow member spaced along its length to distribute liquid, supplied through said arm, out of the arm and over a filter; a plurality of discrete individual support members, each said support member being operatively associated with a single respective jet only, each said jet having one only discrete of said support members associated therewith; each of said support members being individually mounted externally on the arm; a plurality of discrete individual plungers; a plurality of pivotal mounting means for discretely individually pivotally mounting each of said plungers to a respective one of said support members for enabling each of said plungers to be pivotally movable with respect to its said support member independently of every other said plunger, and for providing pivotal movement of each said plunger to cause it to move into and out of its respective said jet to keep the same clear of obstructions.

2. A distributor arm according to claim 1, wherein each support member is mounted on the arm by engagement thereof with a respective jet.

3. A distributor arm according to claim 2, wherein each jet comprises a cylindrical body having an external flange at one end, the said body passing through a hole in said support member and being secured to said arm with said flange engaging said support member to mount it on said arm.

4. A distributor arm according to claim 1, wherein each said jet is screw-threadedly received in a corresponding orifice in said arm.

5. A distributor arm according to claim 1, wherein the support member is substantially rigid and said plunger is pivotally mounted thereon.

6. A distributor arm according to claim 1 wherein each said support member is a plastics moulding including a suspension strap attached to the arm, the strap including a flexing area, and a body portion attached to the strap and including a plunger movable into and out of its jet by flexure of the respective said moulding at its flexing area.

7. A distributor according to claim 6, wherein each said support arm is pendent from the distributor arm.

* * * * *